United States Patent [19]

Franck, III

[11] Patent Number: 5,213,063

[45] Date of Patent: May 25, 1993

[54] ANIMAL TETHERING DEVICE

[75] Inventor: William F. Franck, III, Greensboro, N.C.

[73] Assignee: Windsor Products, Inc., Greensboro, N.C.

[21] Appl. No.: 932,666

[22] Filed: Aug. 20, 1992

[51] Int. Cl.⁵ .............................................. A01K 3/00
[52] U.S. Cl. ................................................. 119/120
[58] Field of Search ..................... 119/107, 120, 153; 482/69

[56] References Cited

U.S. PATENT DOCUMENTS

| | | |
|---|---|---|
| 227,666 | 5/1880 | Witt ..................................... 119/120 |
| 340,554 | 4/1886 | Cannon ................................ 119/120 |
| 466,529 | 1/1892 | Rooney . |
| 819,561 | 5/1906 | Laws .................................... 119/120 |
| 2,179,394 | 11/1939 | Wulff ................................ 119/153 X |
| 2,771,857 | 11/1956 | Soreghen ............................. 119/153 |
| 3,648,664 | 3/1972 | Nunley ............................... 119/120 |
| 4,656,967 | 4/1987 | Duksa .................................. 119/29 |

Primary Examiner—Robert P. Swiatek

[57] ABSTRACT

An improved animal tethering device is provided which prevents the leash from becoming entangled with the legs of the animal or with its free end thereof during rapid directional changes or movement by the animal. One end of the leash line is affixed to the animal and the other end over a pulley apparatus to a weighted loop which engages and slides along the leash line to maintain the leash line in an untangled posture.

20 Claims, 3 Drawing Sheets

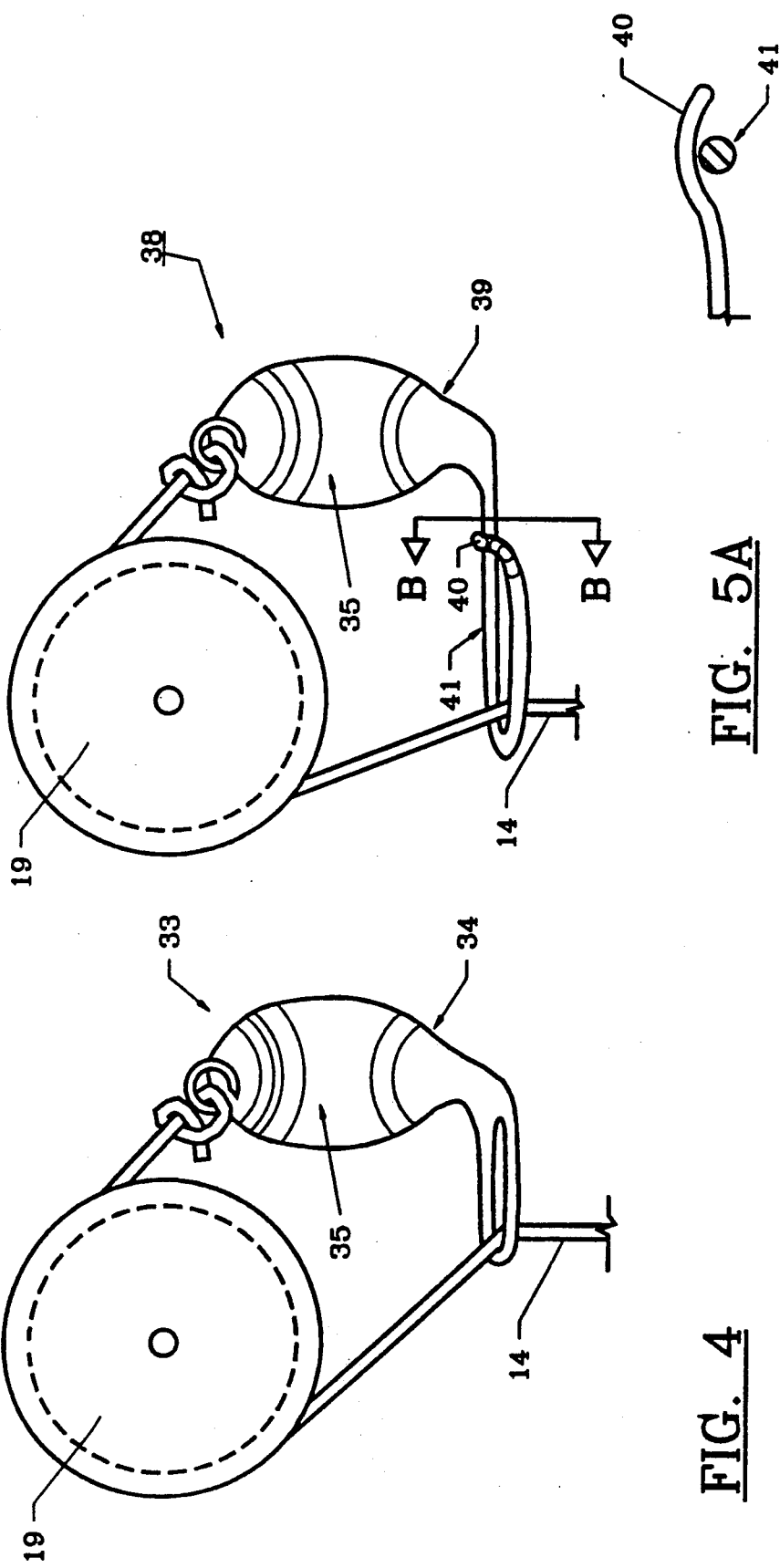

ANIMAL TETHERING DEVICE

BACKGROUND OF THE INVENTION

1. Field Of The Invention

The invention herein pertains to devices for maintaining animals within a specified area and particularly to a leash-type device which allows the animal limited freedom to roam and which can be adjusted to give the animal more or less available territory as desired and which will not become entangled during use.

2. Description Of The Prior Art And Objectives Of The Invention

Urban and surburban dwellers in recent years have had an increasing need for a practical device for maintaining a pet such as a dog in a confined area. Fences, barricades and various leash devices have long been available but have proven unsatisfactory or inconvenient in certain circumstances. In U.S. Pat. No. 227,666 ('666) a counterweight is employed to prevent an animal from becoming tangled in the tethering rope. In a more recent U.S. Pat. No. 4,656,967 ('967), a dog walking device is utilized employing an endless belt suspended between two pulleys to provide a large roaming area. These devices represent two different types of tethers, the '967 device demonstrating a fixed length of leash from a laterally suspended belt, whereas the '666 device allows the leash to shorten or lengthen as a counterweight moves up and down. The device as set forth in U.S. Pat. No. 819,561 ('561) demonstrates a tether which provides a counterweighted leash extending from a horizontal cable. As would be understood, both the '561 and '666 devices could become entangled as the animal may move in a circular path around the weighted end and enwrap the depending lines or other nearby objects.

In order to overcome the disadvantages of the prior art devices as described above, the present invention was conceived and one of its objectives is to provide a leash line which is adjustable in length and which extends from a pulley apparatus positioned on a horizontal cable, yet which will not become entangled with the counterweighted portion of the depending leash line.

It is yet another objective of the present invention to provide a tethering device for an animal having a variable length leash line with an adjustable stop mounted thereon which is convenient and easy to install, adjust and use by the owner.

It is still another objective of the present invention to provide an animal tethering device which includes a weighted loop catch which will slide along the vertical portion of the leash line as the animal roams.

Various other objectives and advantages of the present invention become apparent to those skilled in the art as a more detailed description is set forth below.

SUMMARY OF THE INVENTION

The animal tethering device as presented is useful in preventing animals such as pet dogs or the like from roaming beyond specified limits. Homeowners with small yards can maintain their animals from running into neighbors' yards, gardens and the like while at the same time allowing the animals sufficient freedom and mobility. The invention as described includes a leash line which has a weighted loop catch at one end which travels upwardly and downwardly along the leash line to the pulley thus keeping the free end of the leash line from entanglement with the animal or from the other segment of the leash line. The loop catch may have a variety of shapes and may be tubular. The weighted loop catch weighs more than the leash line thus keeping the "free" end of the leash line taut at all times and out of the animal's path due to the influence of gravity thereupon. At the other end of the leash line which consists of a monofilament nylon line, a clip is provided for releasably affixing to the animal's collar. The pulley apparatus may be mounted on a horizontal cable such as a clothesline to allow the animal additional lateral movement over the selected area.

BRIEF DESCRIPTION OF THE DRAWINGS

FIG. 4 pictures another embodiment of a loop catch;

FIG. 5A shows still another embodiment of a loop catch; and

FIG. 5B shows a sectional view of the loop catch as seen along lines in FIG. 5A.

DESCRIPTION OF THE PREFERRED EMBODIMENT

Figure 2:
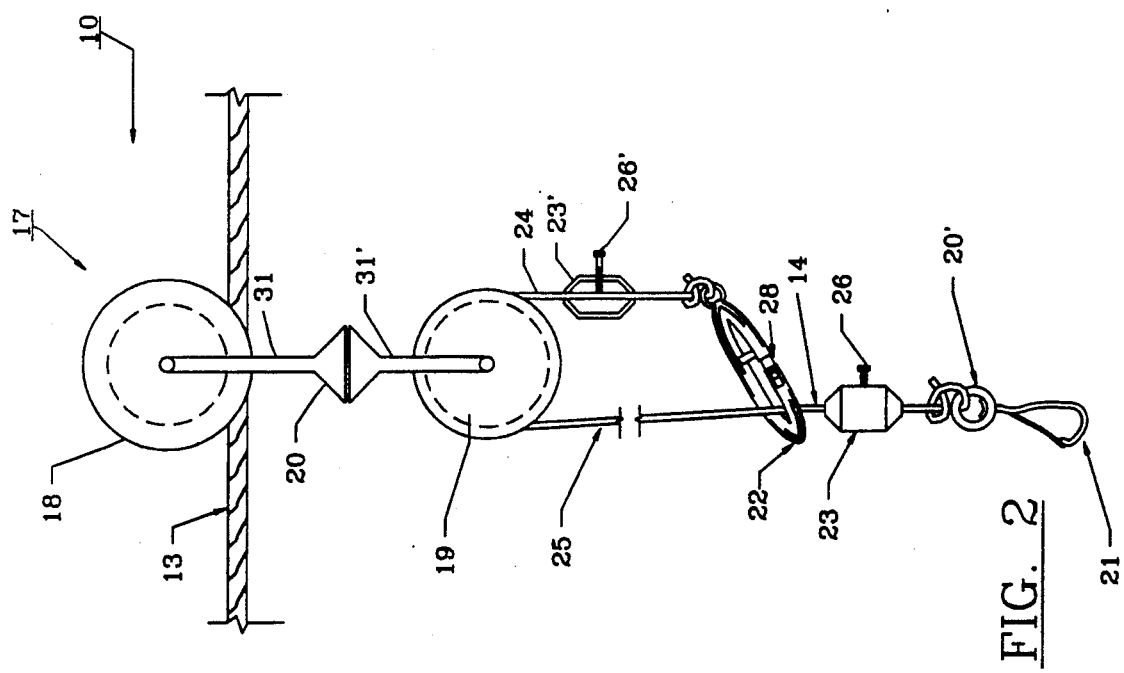
FIG. 2 illustrates a close-up view of the device as seen in FIG. 1.

The preferred form of the invention is shown in FIG. 2 whereby a pulley apparatus comprising a pair of attached pulley wheels is positioned on a lateral cable such as a nylon clothesline. The lower pulley wheel is enwrapped with a monofilament nylon leash line which has a clip at the lower end thereof for releasably attaching to a dog's collar or the like. The opposite end of the leash line includes a weighted loop catch through which the leash line passes. The upward movement of the loop catch is terminated by an adjustable stop affixed above the loop catch on the leash line. The clip end of the leash line likewise includes an adjustable stop having a thumb screw for release and movement of the stop along the leash line. As would be understood, the clip end adjustable stop terminates upward movement once it contacts the loop catch and will not pass through it. The adjustable stop positioned immediately above the loop catch on the leash line is stopped once it contacts the yoke of the pulley apparatus and the stop will not pass between it and the pulley wheel.

DETAILED DESCRIPTION OF THE DRAWINGS AND OPERATION OF THE INVENTION

Figure 1:
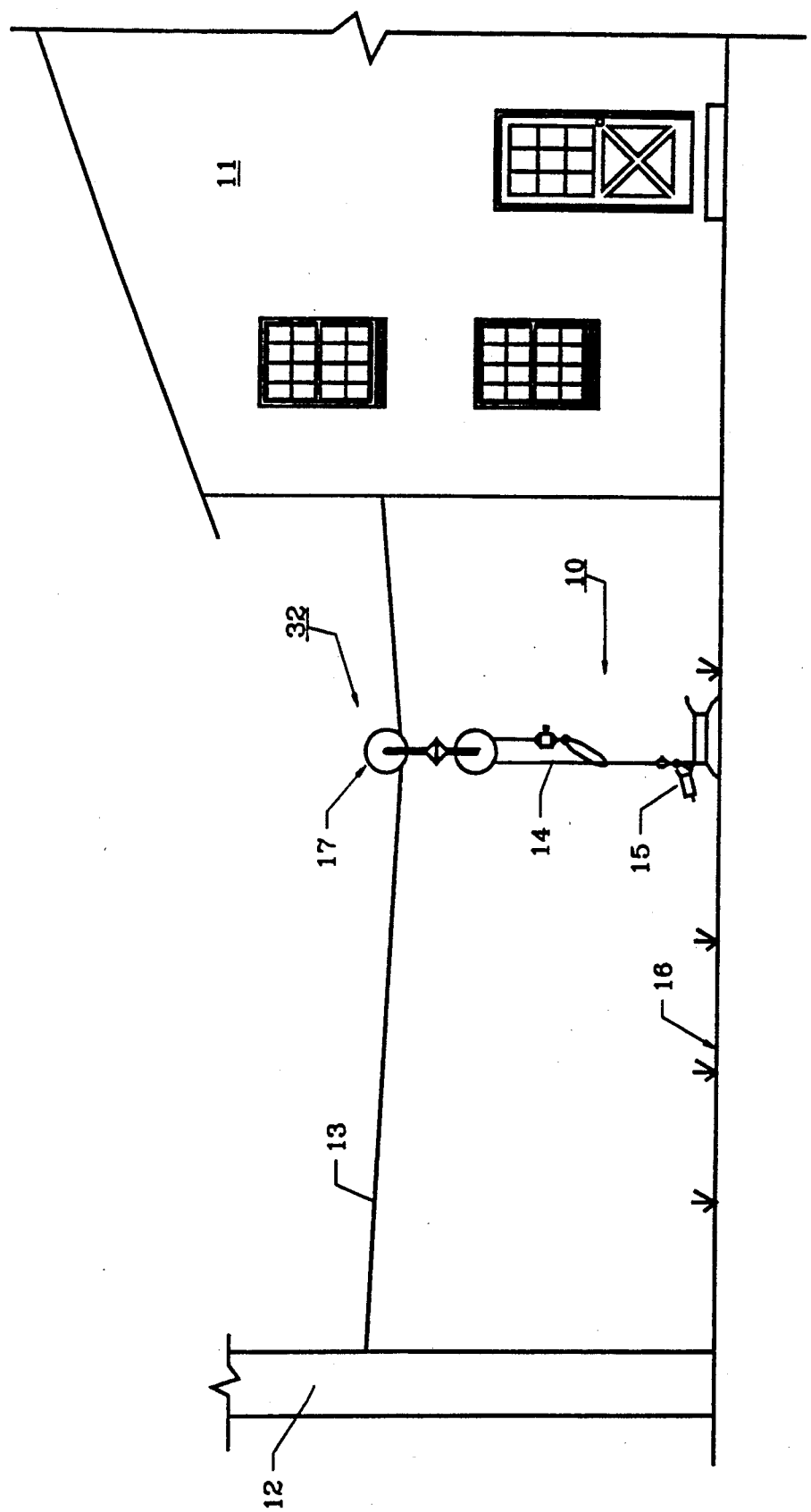
FIG. 1 shows the invention in use for a homeowner's yard.
Figure 3:
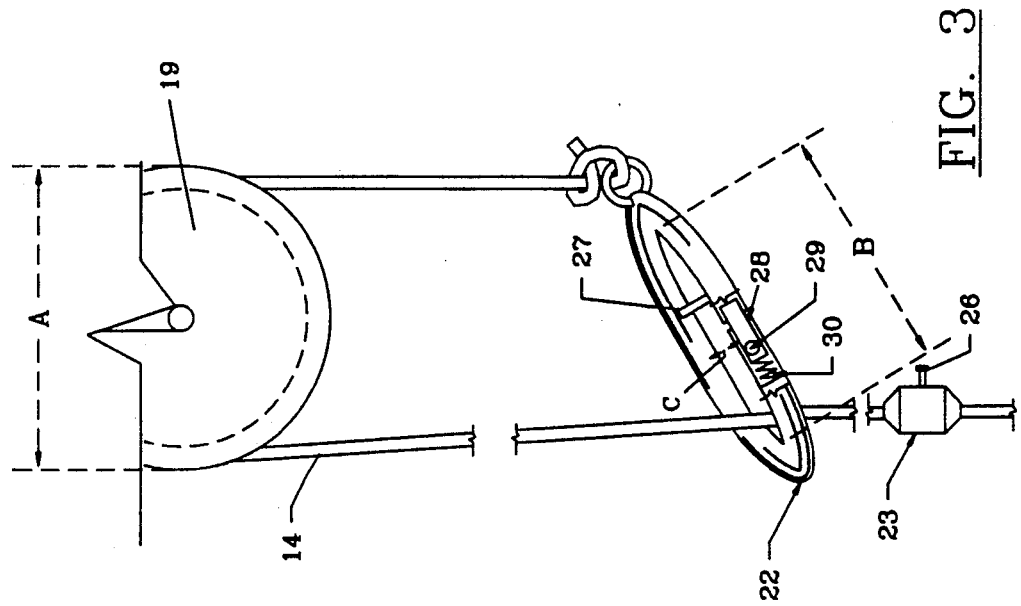
FIG. 3 demonstrates an enlarged section of the device as seen in FIG. 1.

For a better understanding of the invention and its operation, turning now to the drawings, FIG. 1 demonstrates a typical employment of animal tethering device 10 which is affixed to house 11 and tree 12 by a lateral rope or cable 13 which acts along with pulley apparatus 17 as a means 32 to maintain leash line 14 above and spaced from dog 15. Cable 13 may be for example, horizontally attached twenty feet above ground 16 where it cannot be easily reached except with a ladder or the like. As would be understood, cable 13 may be placed at a position lower to the ground than as shown in FIG. 1, but the additional height prevents interference with activities of the occupants of house 11 as they can easily walk thereunder. Pulley apparatus 17 consists of two pulley wheels, upper pulley wheel 18 and lower pulley wheel 19 as shown in FIG. 2. Yoke 31 of upper pulley wheel 18 and yoke 31' of lower pulley wheel 19 are joined by swivel connector 20 which allows 360° rotation of lower pulley wheel 19 relative to upper pulley wheel 18. As would be understood from FIG. 1, upper pulley wheel 18 rolls along cable 13 and travels from tree 12 to house 11 as required by the movement of dog 15. In addition to the lateral movement from house 11 to tree 12, leash line 14 is shortened and lengthened as dog 15 moves towards and away from a position directly below cable 13. As shown, leash line 14 in FIG. 2 extends from collar swivel connector 20' which is joined to clip 21, through pulley wheel 19 to loop catch 22 consisting of a ring-like object. Leash line 14 may consist of a rope, wire or preferably, for small to medium size dogs, a conventional monofilament nylon line having a diameter of 0.130 inches. It has been found that a monofilament line of this diameter will sufficiently hold medium (40–50 lbs.) to small (5–12 lbs.) size dogs without concern for breakage. Leash line 14 as shown in FIG. 1 may have a maximum length of approximately forty feet when cable 13 is positioned twenty feet from the ground although shorter lengths of leash line 14 may be used as suitable under particular circumstances. As shown in FIGS. 2 and 3, loop catch 22 is weighted, i.e., consists of a heavy ring-like object of metal or other materials which weigh approximately the same or more than leash line 14. The weight of loop catch 22 allows it to maintain leash line 14 straight and taut at all times due to the pull of gravity on loop catch 22. Thus, if dog 15 moves inwardly towards a spot directly below cable 13, loop catch 22 will plummet as leash line 14 slides upwardly through loop catch 22 and insures and prevents leash line 14 from becoming entangled with the legs of the dog. In addition, by having loop catch 22 encircle leash line 14 the weighted segment 24 of leash line 14 (beyond pulley apparatus 17) will remain straight and parallel to the collar segment 25 (prior to pulley apparatus 17) of leash line 14 thereby keeping both segments essentially straight, tight and parallel.

To assist in convenience and use, adjustable stop 23 is shown in FIG. 2 positioned slightly above collar clip 21. Stop 23 which has both ends tapered or conically shaped includes a thumb screw 26 which is manually tightenable internally against leash line 14. Adjustable stop 23 is dimensioned so it will not pass through the inside diameter "C" of loop catch 22 as shown in FIG. 3. Thus stop 23 is adjustable and provides convenience to the user in the event that collar clip 21 is inadvertently released while leashing or unleashing dog 15, whereby collar clip 21 would ascend to pulley apparatus 17 without stop 23 in place. In addition to adjustable stop 23 positioned on collar segment 25 of leash line 14, adjustable stop 23' (shown in cut-away form in FIG. 2) is positioned on leash line weighted segment 24. Adjustable stop 23' will terminate its upward movement by contacting yoke 31' of pulley wheel 19. Stop 23 could be molded or made an integral part of collar clip 21 and adjustable stop 23' could be integrated into loop catch 22 as explained in more detail hereinafter.

As further shown in FIG. 3, pulley wheel 19 has a diameter A which is greater than the overall opening length B of loop catch 22. This difference prevents loop catch 22 from passing over pulley wheel 19 and possibly jamming and provides a stop mechanism for leash line 14 in the event that adjustable stop 23' is not in place as shown in FIG. 3.

In FIG. 4, loop catch 33 is shown which comprises a substantially L-shaped member 34 which can be used without adjustable stop 23' as depicted in FIG. 2. Other loop catch configurations may be employed, such as tubular, circular or helical designs. Loop catch 33 has an enlarged or bulbous portion 35 which comprises most of the weight of L-shaped member 34. Thus as seen in FIG. 4, loop catch 33 has an integrally formed stop as represented by bulbous portion 35. In FIGS. 5A and 5B, loop catch 38 comprises yet another embodiment of a somewhat L-shaped loop catch 38 whereby shank portion 39 comprises the greater part of the weight. Loop catch 38 and loop catch 33 as shown in FIG. 4 can be molded of a suitable metal such as iron or could be formed from a non-rusting stainless steel or the like. FIG. 5A demonstrates another type of openable loop catch in that finger 40 is slightly raisable from extension 41 to allow leash line 14 to slide therebetween for ease in assembly and disassembly.

Loop catch divider 27 restricts the movement of leash line 14 within loop catch 22 as shown in FIG. 3 and under certain circumstances may be useful in preventing leash line 14 entanglement. Another feature of loop catch 22 consists of spring-loaded latch 28 which allows loop catch 22 to open and close by manual pressure applied to latch pull 29 which is attached to latch 28 which is resiliently contained within loop catch 22 by coil spring 30.

In use, the collar (not shown) of dog 15 is affixed to collar clip 21 and thereafter, as dog 15 moves toward a spot directly below cable 13, loop catch 22 slides downwardly along leash line 14. As dog 15 moves outwardly, away from a position directly below cable 13, loop catch 22 moves upwardly until termination occurs either by loop catch 22 striking pulley wheel 19 as shown in FIG. 3 or by adjustable stop 23' (if in place) contacting yoke 31' of pulley wheel 19. Thus, leash line 14 is kept out of the way of dog 15 and cannot become entangled by its normal swinging or movement.

The illustrations and examples provided herein are for explanatory purposes and are not intended to limit the scope of the appended claims.

I claim:

1. An animal tethering device comprising: a leash line, one end of said leash line for attachment to said animal, a loop catch, said loop catch attached to the other end of said leash line, means spaced from said animal to maintain said leash line above said animal, said leash line positioned on said leash line maintaining means with said loop catch slidably positioned over said leash line between said animal and said leash maintaining means whereby said leash line can be lengthened or shortened relative to said leash line maintaining means as said loop catch slides along said leash line.

2. An animal tethering device as claimed in claim 1 wherein said loop catch comprises a ring-like object.

3. An animal tethering device as claimed in claim 2 wherein said ring-like object weighs approximately the same as said leash.

4. An animal tethering device as claimed in claim 2 wherein said ring-like object weighs more than said leash.

5. An animal tethering device as claimed in claim 1 wherein said leash line maintaining means comprises pulley apparatus.

6. An animal tethering device as claimed in claim 5 wherein said pulley apparatus comprises a swivel connector.

7. An animal tethering device as claimed in claim 5 wherein said pulley apparatus comprises a pair of pulley wheels, said pulley wheels joined to each other.

8. An animal tethering device as claimed in claim 7 and including a swivel connector, said swivel connector joined to said pulley wheels therebetween.

9. An animal tethering device as claimed in claim 1 and including lateral suspension means, said suspension means connected to said leash line maintaining means.

10. An animal tethering device as claimed in claim 9 wherein said lateral suspension means comprises a substantially horizontal cable.

11. An animal tethering device as claimed in claim 1 wherein said leash line comprises a monofilament nylon line.

12. An animal tethering device as claimed in claim 1 wherein said loop catch is openable.

13. An animal tethering device comprising: a leash line, one end of said leash line for attachment to an animal, the other end of said leash line comprising a heavy loop catch, means to maintain said leash line above said animal, said leash line maintaining means spaced from said animal for attaching said leash line thereto, said leash line extending from said leash line maintaining means through said loop catch to said animal to lengthen or shorten said leash line as said loop catch slides along said leash line.

14. An animal tethering device as claimed in claim 13 wherein said leash line maintaining means comprises pulley apparatus.

15. An animal tethering device as claimed in claim 13 wherein said heavy loop catch weighs approximately the same as said leash line.

16. An animal tethering device as claimed in claim 13 wherein said heavy loop catch weighs more than said leash line.

17. An animal tethering device as claimed in claim 13 wherein said loop catch is openable.

18. An animal tethering device as claimed in claim 13 wherein said leash line comprises a stop member.

19. An animal tethering device as claimed in claim 13 wherein said leash line comprises a resilient clip, said clip for attachment to said animal.

20. An animal tethering device as claimed in claim 13 wherein said loop catch comprises a substantially L-shaped member.

* * * * *